Sept. 3, 1935.  D. C. SEITZ  2,013,425

APPARATUS FOR AND METHOD OF DISPENSING CARBONATED BEVERAGES

Filed Nov. 18, 1933

Patented Sept. 3, 1935

2,013,425

UNITED STATES PATENT OFFICE 2,013,425

APPARATUS FOR AND METHOD OF DISPENSING CARBONATED BEVERAGES

Dean C. Seitz, Lakewood, Ohio, assignor to Russ Soda Fountain Company, Cleveland, Ohio, a corporation Application November 18, 1933, Serial No. 698,651

2 Claims. (Cl. 225—1)

This invention relates to dispensing apparatus and more particularly to apparatus for and the method of dispensing beer and other carbonated beverages.

One of the objects of the present invention is to provide beverage dispensing apparatus of such new and improved construction that carbonated beverages can be dispensed at desired temperatures with a desired quantity of $CO_2$ gas maintained in the absorbed state.

Another object is to provide beer dispensing apparatus of such construction that the beer when dispensed will be fresh and palatable and will have the desired amount of foam or collar.

Another object is to provide beer dispensing apparatus so constructed that excessive foaming of the beer being dispensed will be minimized and that the beer dispensed will have an amount of foam not in excess of 30% by volume.

A further object is to provide dispensing apparatus by which beer can be dispensed at a desired temperature without undue release of the absorbed or natural $CO_2$ gas.

A still further object is to provide a method of dispensing beer and other carbonated beverages by which a glass of beer can be drawn which has a desired amount of foam and yet will have a sufficient amount of $CO_2$ gas maintained in the dissolved state to provide the desired sharpness and palatability.

With the above and other objects in view, which will be readily understood from the following description, the present invention consists in certain features of construction and combinations of parts which will be readily understood by those skilled in the art to which the invention appertains.

Figure 1:
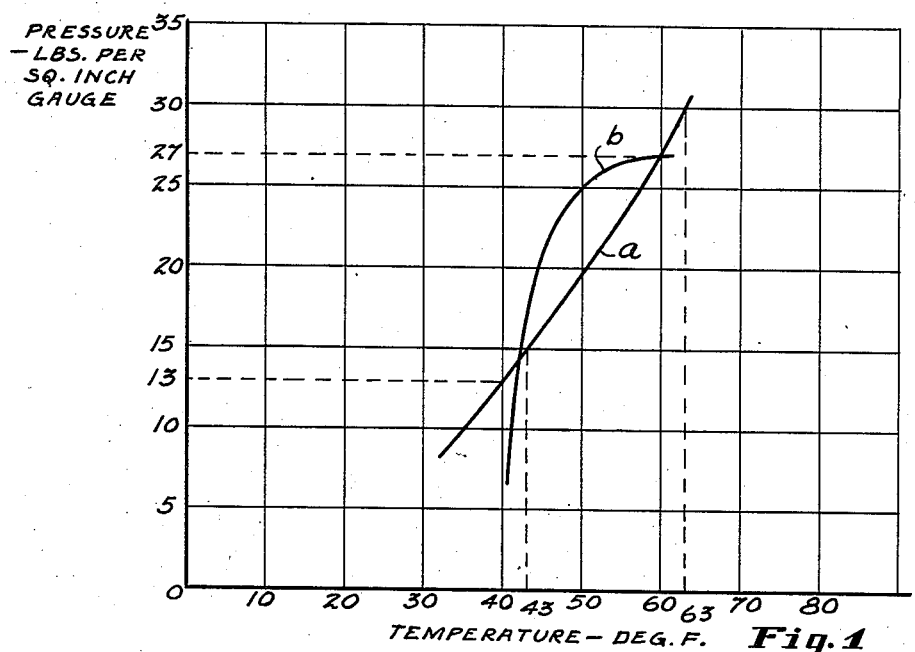
Figure 2:
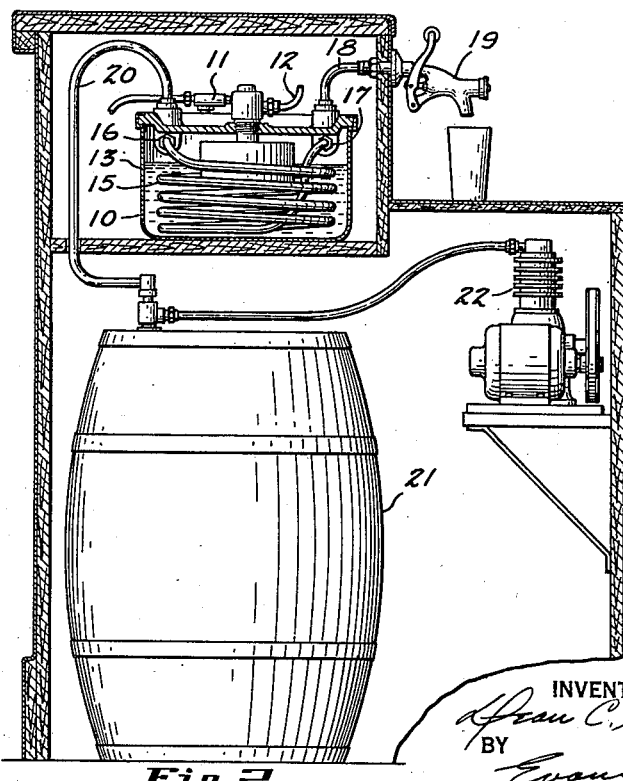

In the accompanying drawing:

Figure 1 is a diagram showing the pressure-temperature relation of $CO_2$ gas of a certain volume in beer, and also showing the pressure-temperature relation in a cooling coil with beer flowing, embodying the features of the present invention; and Figure 2 is a section through a cooling apparatus in which the present invention is incorporated.

For the purposes of illustration and description of the present invention in connection with a carbonated beverage, I have selected beer, although it is to be understood that the present invention is also applicable to other carbonated beverages such as root beer, ginger ale, etc.

Beer as brewed and as delivered in kegs from the brewery consists essentially of an aqueous solution containing a solid content of proteins and carbohydrates, and, in many cases, and for example approximately 2½ volumes of $CO_2$ gas. This $CO_2$ gas content is obtained through the solubility of the natural $CO_2$ gas during fermentation, and/or by mechanical carbonation, and it is highly desirable that this amount of gas be substantially in the dissolved state when the beer is dispensed into a glass in order that the beverage shall be fresh and palatable. Quite frequently, beer as dispensed has a dead or flat taste which is due to the fact that it has lost a large part of its dissolved $CO_2$ gas through improper cooling and dispensing.

It is the purpose of the present invention to provide a method of and apparatus for dispensing beer and other carbonated beverages whereby a glass of the beverage can be delivered to the consumer with a sufficient amount of dissolved $CO_2$ gas in it to provide the desired sharpness and palatability, and also with an amount of foam or collar not exceeding 30% by volume.

In beer containing, for example, 2½ volumes of $CO_2$ gas there is a definite relation between the pressure of the gas and the temperature of the carbonated beer, which relation is simply that the higher the temperature the higher the pressure in the keg or container.

I have plotted this relation for a beer containing 2½ volumes of $CO_2$ gas in the curve shown in Fig. 1 and it will be noted from the curve A that at 40° F. the $CO_2$ gas exerts a pressure of 13 pounds per square inch, and similarly at 60° F. this gas exerts a pressure of 27 pounds per square inch. This means that, for example, at 60° F. a pressure of 27 pounds per square inch should be maintained on the beer to keep all of the original gas in the dissolved state. Similarly at 40° F. considering this to be the temperature of the cooled beer as it is being dispensed, a pressure of 13 pounds per square inch should theoretically be maintained in order to keep all of the gas in a dissolved state. The pressures here given and indicated in curve A are approximate, however, and may vary.

Referring again to the curve, it will be noted that a pressure of thirty pounds will provide for the maintenance of the gas in a dissolved state at a temperature up to 63° F. and this temperature is as high as ever should be allowed on a keg of beer, since at temperatures between 60° and 65° F. unpasteurized beer may start to actively ferment again. Usually the beer in the keg when connected with the dispensing apparatus is kept at a temperature below 60° F. and this is highly recommended. However, in order to compensate for the possibility of occasional higher temperatures I have selected a pressure of 30 pounds per square inch minimum to be maintained on the beer in the keg.

Heretofore it has been the practice to employ much lower pressures such as 15 pounds per square inch or lower in the beer keg, and it is apparent that at temperatures over 43° F. this being the temperature corresponding with the pressure of 15 pounds as indicated in the curve, 15 pounds per square inch is insufficient to maintain the gas in the absorbed state. In such a case, the gas, because of the supersaturated state of the beer in the keg, is liberated in the container and dispensing coil and this gas, during the dispensing operation, has the tendency to produce an objectionably large amount of foam.

To further illustrate the application of the present invention, I shall describe the same in connection with a mechanically refrigerated cooler.

Referring to Fig. 2, the cooler selected for illustration of the process includes a closed container 10 which has connections 11 and 12 with a suitable mechanical refrigerating unit (not shown) and which contains a liquid refrigerant 13. The beverage to be cooled and dispensed passes through a coil 15 immersed in the refrigerant. The coil 15 is connected with the inlet and outlet connections 16 and 17, respectively. The outlet connection 17 connects through a short tube 18 with the faucet 19 and the inlet connection 16 connects through a riser 20 with the keg or container 21. A suitable means 22 preferably apparatus for introducing air under pressure is provided to obtain the desired pressure within the keg 21. Instead of the source of air under pressure, a suitable means for introducing $CO_2$ gas under pressure into the keg may be employed, but I prefer the use of air pressure.

It is to be understood, however, that two or more coils connected with a corresponding number of faucets may be employed in the same container 10.

The problem which I have solved by the present invention is to insure that the beer in the keg 21 at a temperature of, say, 60° F. and a $CO_2$ gas pressure of 27 pounds per square inch can be dispensed into a glass from the faucet 19 at a temperature of 40° F., which has been found to be the most desirable dispensing temperature, and without excessive foaming, but in such condition that it will be fresh and palatable, that is, a condition in which substantially all of the original $CO_2$ gas remains in the beer dissolved as originally intended by the brewer to give the desired palatable taste, such gas being either dissolved or contained in the solid body of beer and in a foam content of not over 30% by volume.

The cooling process after the beer leaves the keg is important, for, as is apparent from the pressure temperature diagram, the solubility of the $CO_2$ gas in the beer depends not only upon the pressure but also upon the temperature. Therefore, since I contemplate the gradual reduction of pressure on the beer by friction during the flow through the coil, the beer should be cooled at the same time and the pressure drop should be such that the solubility of the $CO_2$ gas will not be materially reduced. In other words, the temperatures and pressures in drawing a glass of beer in which all of the original gas is in the dissolved state, should approximately follow the proper temperature-pressure relation as indicated in the curve, or for a given temperature the pressure should preferably be above the curve, otherwise $CO_2$ gas will be liberated in the cooling coil.

By dispensing a glass of beer in such a manner as to maintain all of the gas in the dissolved state, that is by maintaining the pressures and temperatures during the dispensing operation at values above the curve A, no foam except for that released by mechanical agitation in the consumer's glass would be produced. However, the consumer demands a glass of beer having a substantial foam or collar, otherwise he feels that a beer with no collar will be stale and flat and he will not again patronize such a dispenser. On the other hand, the consumer does not desire a glass of beer having an objectionably large volume of foam, for in this case an excessive quantity of the $CO_2$ gas has been liberated and the beer is actually flat. A glass of beer having the original $CO_2$ gas, which was put in by the brewer, maintained in the solid body and in a body of foam not exceeding 30% by volume, is very satisfactory and has the desired sharpness and palatability.

I contemplate the production of a sufficient body of foam on a glass of beer during the dispensing operation while maintaining an amount of initial $CO_2$ gas sufficient to give the proper taste, by departing at a predetermined point in the cooling coil from the natural pressure temperature relations indicated in the curve, and in fact by substantially controlling the liberation of the $CO_2$ gas.

Whereas heretofore no particular regard has been given to the cooling of the beer and the type or size of the conduit other than a conduit of sufficient area to produce the desired drop in temperature, I pay particular attention to the type of cooling medium and the manner of dissipating the pressure on the beer during the process of cooling in order to maintain pressure and temperature values sufficiently close to the natural values to maintain a suitable amount of gas in the dissolved state in the body of beer to provide the desired taste and yet liberate only enough gas to produce a foam of not more than 30% by volume.

Assuming a pressure of 30 pounds per square inch on the beer in the keg and allowing a value of 4 pounds per square inch for the pressure drop through a standard ½" barrel tap rod (this value being arrived at from experimental determination), I propose to dissipate the remaining 26 pounds per square inch in the conduit at the desired rate of flow. In order to avoid as much as possible undue mechanical agitation of the beer which has a tendency to knock out or release the $CO_2$ gas, I desire to gradually dissipate this 26 pounds pressure through friction in a conduit having sufficient surface area to provide for the required heat transfer, rather than through restrictions, such as valves, that set up a mechanical turbulence.

The demands of cooling the beer also require a minimum length of coil having a definite surface area and this surface area must be such as to provide for the necessary heat transfer at a selected rate of flow to reduce the temperature down to the dispensing temperature.

There are certain factors that are taken into consideration and one of these is the rate of flow from the keg or container. It has been found from experimentation that a rate of flow of not over 2.25 gallons per minute, is very satisfactory inasmuch as higher rates will produce excessive foaming and the consequent release of $CO_2$ gas through mechanical agitation.

We now have two factors, namely, a gas pressure in the keg of 30 pounds per square inch or more, and a desired rate of flow of not over 2.25 gallons per minute.

Formulæ are of course available for determining the proper length of conduit to accomplish a predetermined pressure drop. One such formula for conduits of smooth circular cross section is:

$$P = KL \frac{Q^{1.8}}{d^{4.85}}$$

in which P represents the total pressure drop, L the length of pipe, Q the rate of discharge, $d$ the inside diameter, and K a constant depending on the shape, kind, form of winding, etc. of the conduit.

By such a formula it is possible to determine the length of conduit necessary to produce a given pressure drop at a given rate of discharge.

For a given cross-sectional area, a greater pressure drop can be obtained in an oblong conduit than in a standard circular conduit because of the increased friction or resistance to flow. Furthermore, a larger surface of the fluid is exposed for the transfer of heat and, therefore, a greater transfer of heat per unit of length can be obtained in a conduit that has a cross-sectional shape resembling a rectangle having semi-circular ends, than in a circular tubing of the same length and cross-sectional area. A tubing of such cross-sectional shape is preferred, and the required length of such a coil to obtain a given pressure drop at a given rate of flow can be determined by using the following formula:

$$P = K'L \frac{Q^{1.8}(W.P.)^{1.25}}{A^3};$$

where
- P     is the total pressure drop
- L     is the length of conduit
- Q     is the rate of discharge
- (W.P.) is the wetted perimeter
- A     is the inside cross-section
- K'    is a constant depending on the shape, kind, form of winding, etc. of the conduit.

In the example selected for illustration the pressure on the beer in the coil is dissipated under draft conditions in the conduit, that is, it is dropped from 26 pounds per square inch to zero gage since the beer leaves the faucet at atmospheric pressure. Also the temperature of the beer is dropped during the cooling process from 60° F. to 40° F. However, the proper pressure at 40° F. sufficient to maintain all of the absorbed gas in solution is 13 pounds per square inch but, as before stated, I do not wish to maintain all of the gas in solution as I desire to control the liberation of gas in such a manner as to provide the desired amount of foam.

In the example of a beer containing 2½ volumes of $CO_2$ gas which is to be reduced from a temperature of 60° to 40°, I prefer to defer the liberation of gas as long as possible and preferably until such time as the pressure on the beer has dropped to at least 15 pounds per square inch or less, this being the pressure corresponding to 43° F. The liberation of gas from a beer under a natural pressure of 15 pounds per square inch, due to a small differential of pressure, will not cause excessive foaming. I, therefore, employ a direct heat transfer cooler from which the beer in the conduit will be rapidly cooled at first and in which the rate of cooling per unit of length of conduit at first will be greater than straight line cooling. The temperature and pressure values in the case of straight line cooling would lie from the very inception of cooling, below the normal pressure temperature values shown in curve A for the particular beer in question, with the result that liberation of gas would commence at the very start of the cooling operation and would cause excessive foaming because of the accumulation of liberated gas. However, the direct heat transfer cooler provides a condition in which the cooling rate per unit of conduit length is high as regards the pressure drop per unit of conduit length, up to the point at which it is desired to deviate from the temperature-pressure curve to produce the desired foam.

The curve B of Fig. 1 represents the pressure drop in a selected conduit plotted against the temperature and it will be noted here that the temperature is lowered relatively rapidly at first and that the curve B intersects curve A substantially at a temperature of 43°, the corresponding pressure being 15 pounds per square inch. From this point on, the pressure values lie below the normal curve, and because of the fact that the pressure values are less than the normal pressure values at temperatures between 43° and 40°, gas will be liberated, and it is the liberation of these gases that I utilize for producing the desired amount of foam.

It is noted, therefore, that in the device incorporating my invention, the liberation of foam producing $CO_2$ gas is restrained until such time as the temperature of the flowing beverage is lowered, at least nearly to the dispensing temperature or in other words, that the absorbed gas is maintained in solution until the dispensing temperature is nearly reached.

Inasmuch as different beers may contain different volumes of $CO_2$ gas and as the beer keg in different installations may be at different elevations with respect to the location of the cooling coil, some adjustment of the pressure in the keg may have to be made.

It is to be understood that wherever the term "to substantially maintain the dissolved gases in solution" is used, I mean a condition where only enough gas has been liberated to provide for the foam condition heretofore mentioned, that is, a condition in which substantially all of the original $CO_2$ gas is contained in the body of beer and foam or collar, which collar is not more than 30% by volume.

It is also to be understood that the term "direct heat transfer cooler", wherever used in the specification and claims, includes all cooling devices in which the beverage or liquid is to be cooled by conduction, such as for example a device in which the beverage conduit is either immersed in a liquid refrigerant or refrigerant vapor, or in direct contact with a conduit containing liquid refrigerant or refrigerant vapor.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The method of dispensing beer through a cooling conduit and heat absorption system which comprises maintaining a pressure on the beer at the source of supply sufficient to hold the $CO_2$ gas of the beer in the absorbed state, causing the beer to flow through the conduit at a predetermined rate while gradually dissipating the pressure on the beer solely through frictional contact with the walls of the conduit and simultaneously therewith cooling the flowing beer relatively rapidly at first and at a rate per unit of conduit length which is high relative to the rate of pressure drop for the same unit of conduit length during a portion of the flow of the beer through the conduit, and at a point in the conduit at which the beer is substantially at the dispensing temperature, and slightly in advance of the point of drawing off allowing the pressure on the beer to fall below the pressure necessary to hold the gas in the absorbed state at said dispensing temperature.

2. Apparatus for dispensing beer comprising means for supplying the beer under a pressure sufficient to maintain the gases in the beer in the absorbed state, a dispensing faucet, a coiled conduit, means connecting said conduit with said first means, means connecting said conduit with said faucet, and a sealed container surrounding said coiled conduit for receiving and circulating a refrigerating medium about said coiled conduit, said coiled conduit, container and refrigerating medium providing a direct heat transfer means for cooling the beer flowing through said coiled conduit rapidly during the initial portion of flow through said coiled conduit, said coiled conduit being of uniform internal size and having such resistance to the flow of beer that a greater pressure drop as compared to circular conduits is provided, said coiled conduit also being of such length that the heat removed from and the pressure maintained on the beer at all points of travel through said conduit is sufficient to maintain the gases in the absorbed state during substantially the entire period of heat transfer.

DEAN C. SEITZ.